(12) United States Patent
Chimenti

(10) Patent No.: US 6,398,090 B1
(45) Date of Patent: Jun. 4, 2002

(54) GUIDED SECUREMENT ARRANGEMENT IN A LOAD CARRIER

(75) Inventor: Thomas A Chimenti, Fairfield, CT (US)

(73) Assignee: Industri AB Thule (SE)

( * ) Notice: Subject to any disclaimer, the term of this patent is extended or adjusted under 35 U.S.C. 154(b) by 0 days.

(21) Appl. No.: 09/682,461

(22) Filed: Sep. 5, 2001

Related U.S. Application Data

(63) Continuation-in-part of application No. 09/805,370, filed on Mar. 13, 2001, and a continuation-in-part of application No. 09/259,442, filed on Mar. 1, 1999, now Pat. No. 6,305,589.
(60) Provisional application No. 60/230,075, filed on Sep. 5, 2000, and provisional application No. 60/189,070, filed on Mar. 13, 2000.

(51) Int. Cl.[7] ................................................ B60R 9/04
(52) U.S. Cl. ...................... 224/321; 224/315; 224/322; 224/326
(58) Field of Search ................................ 224/319, 320, 224/321, 322, 309, 314, 315, 325, 326, 327, 329, 330, 331

(56) References Cited

U.S. PATENT DOCUMENTS

| | | | | | |
|---|---|---|---|---|---|
| 4,757,929 A | * | 7/1988 | Nelson | ................. | 224/320 |
| 4,778,092 A | * | 10/1988 | Grace | ................. | 224/314 |
| 5,419,479 A | * | 5/1995 | Evels et al. | ................. | 224/309 |
| 5,464,140 A | * | 11/1995 | Hill | ................. | 224/315 |
| 5,511,708 A | * | 4/1996 | Cronce et al. | ................. | 224/321 |
| 5,758,810 A | * | 6/1998 | Stapleton | ................. | 224/321 |
| 5,931,359 A | * | 8/1999 | Zona | ................. | 224/321 |
| 6,010,048 A | * | 1/2000 | Settelmayer | ................. | 224/315 |

* cited by examiner

*Primary Examiner*—Stephen K. Cronin
(74) *Attorney, Agent, or Firm*—Kilpatrick Stockton LLP

(57) ABSTRACT

An arrangement in a load carrier for securing a load carrier cross bar to a transporting vehicle including a top portion of a load carrier foot adapted to releasably engage a load carrier cross bar. The load carrier cross bar has an elongate slot through a lower surface thereof. The elongate slot provides access to an interior space of the load carrier cross bar. An upper surface of the top portion of the load carrier foot is configured to abuttingly engage the lower surface of the load carrier cross bar. An insertible member is provided for interconnecting the load carrier cross bar to the load carrier foot. The insertible member has a neck portion and an expanded portion. The neck portion is configured to extend through the elongate slot and the expanded portion is configured to reside in the interior space of the load carrier cross bar in an assembled configuration. The expanded portion of the insertible member has a pressing surface configured to abuttingly engage an interior receiving surface of the load carrier cross bar so that a downward bias is exerted by the expanded portion and urges the load carrier cross bar into abutting engagement with the load carrier foot. The insertible member has a guide projection and the top portion of the load carrier foot has an inclined guide track configured to receive the guide projection therein for reciprocating movement of the guide projection in the guide track. An operating assembly reciprocates the guide projection in the guide track thereby causing movement of the insertible member toward the load carrier foot.

11 Claims, 17 Drawing Sheets

GUIDED SECUREMENT ARRANGEMENT IN A LOAD CARRIER

CROSS REFERENCE TO RELATED APPLICATIONS

The present application is a continuation-in-part of U.S. patent application Ser. No. Ser. No. 09/259,442 filed Mar. 1, 1999 now U.S. Pat. No. 6,305,589 and 09/805,370 filed Mar. 13, 2001 and claims the benefit of U.S. Provisional Patent Application No. 60/230,075 filed Sep. 5, 2000 and No. 60/189,070 filed Mar. 13, 2000 through Ser. No. 09/805,370; the disclosure of each of these prior patent applications is hereby expressly incorporated in the entirety into this patent application by reference.

BACKGROUND OF INVENTION

1. Technical Field

The present invention relates generally to vehicular load carriers, and more specifically to securement arrangements in such load carriers for exemplarily securing load carrier struts to supporting load carrier feet.

2. Background Art

It is appreciated that a considerable amount of the time that is required to install a load carrier upon a vehicle is that time which is spent on the assembly of the carrier itself prior to its being attached to the transporting vehicle. As a result, it has been found to be an advantageous feature of carrier designs to enable installation and removal of a partially or fully assembled load carrier on to and off of a transporting vehicle.

Known designs for carrier feet that can be installed upon and disconnected from the transporting vehicle while the carrier remains assembled are typically engaged upon a base fixed to the vehicle using a sliding motion parallel to the longitudinal axis of both the load carrier foot and the transporting vehicle. This becomes problematic when the entire carrier is to remain assembled during removal because each foot must be simultaneously removed by being slid off of or out of its respective base together with the other feet. Similar difficulty is encountered when trying to install an assembled carrier onto a transporting vehicle's rooftop or other receiving surface. Each foot must be slidingly engaged upon its respective base, and because that base may not be a perfect fit with the foot, or the base may have become fouled while the foot was disengaged, sliding of the foot onto the base may be resisted. This experience has been likened to trying to slide a sticky drawer into a bureau. Previously, when the feet would each be individually installed upon the respective bases before the load carrier was assembled thereto, an operator could move about the transporting vehicle and manipulate each foot individually. Normally this includes wiggling the load carrier foot onto the base in order to progressively slide the load carrier foot into a properly seated position upon the base. Having configured each foot, the carrier could then be assembled thereupon. A compounding problem of such a process, however, is that the carrier feet are usually upon the roof of a transporting vehicle at this stage in the process and resultantly, assemblage of the load carrier must be awkwardly carried out atop the vehicle. Necessarily, the operator will be reaching atop the transporting vehicle to complete the installation of the load carrier and be required to frequently move about the vehicle because that person's reach will be limited by the roof-top location.

Similar problems can be encountered when only a cross bar or strut is connected between two opposite feet and which must be installed to extend from one side to the other of the transporting vehicle. It will be difficult, if not impossible for a single person working alone to slide each foot onto its respective base because he or she will not be able to simultaneously align both feet with the two respective bases as is required for proper sliding engagement.

Conventional designs for such support feet have, in the past, required that an exterior cover be opened in order to expose for manipulation the operating device that affects the fastening of the load carrier foot to its base. Therefore, when installing the foot upon the base, the exterior cover would normally be open so that the operating device can be manipulated into an open configuration for engagement upon a base or directly to a vehicle. Once engaged, however, the operating device must then again be manipulated to a closed or clamping configuration for fixing the foot to the base or vehicle. The exterior cover of the load carrier foot is then closed and locked to prevent unauthorized tampering with the operating device. From the experience of working with these conventionally designed carrier feet, it has been recognized as desirable to minimize not only the exposure of the internal working parts of the foot, but to also minimize required operator interaction during the installation process when both hands can be better used for properly positioning at least the several feet, and possibly an entirely assembled carrier with respect to the various connection points for attachment thereto.

Another drawback of conventionally designed carrier feet are that they do not typically include an accommodation for adapting to differently configured vehicle mounting surfaces. This is particularly true in cases where the feet are attached to the vehicle's roof at edge regions where contoured slopes are generally incorporated into the vehicle's design. Normally, the base for the foot is rigidly attached to the vehicle's roof in this sloped region and it is the load carrier foot that is specially designed to be fixedly attached to that particular type of vehicle and to compensate for the roofs configuration. As a result, the manufacturer of the feet must essentially provide custom designs for differently configured roof tops. It has been recognized as highly desirable by such manufacturers to enable a generic load carrier foot design to be utilized on a wide range of differently configured transporting vehicle's. Because the primary characteristic affecting this aspect of the design is the degree of slope at the roof region where the base is attached, it has been recognized for the present invention that facilitating pivotation of the load carrier foot with respect to the base in the direction substantially parallel to the cross bar with which attachment must be made permits utilization of a uniformly designed load carrier foot on multiple and differently configured transporting vehicles.

Still yet another drawback is associated with undesirable binding effects occurring in the upper mechanism that secures the load carrier cross bar to the main foot assembly. Because the length dimension of the securing member that moves up the ramp(s) into engagement with the underside of the cross bar is not much longer than it is wide, it is sometimes possible for that member to tilt or rock out of face-to-face engagement with the cross bar resulting in a biting and/or binding affect that inhibits operation of the securement assembly.

In view of the above described deficiencies associated with known designs for load carrier feet and certain securement assemblies associated therewith, multiple aspects of the presently disclosed invention(s) have been developed to alleviate these drawbacks and provide benefits to the user which have been appreciated as desirable at least partially through historical use of these known designs. These enhancements and benefits are described in greater detail hereinbelow with respect to several alternative embodiments of the presently disclosed invention(s).

SUMMARY OF INVENTION

The present inventions in their several disclosed embodiments alleviate the drawbacks described above with respect to conventionally designed load carrier feet and incorporate several additionally beneficial features.

A primary benefit of the load carrier foot design of the present invention is that it permits a load carrier foot to be engaged upon a supporting base in a substantially vertical direction and without operator manipulation of latching mechanisms in the load carrier foot. Installation is accomplished merely by positioning the load carrier foot properly upon the base. This eliminates the sliding engagement described above which has been appreciated as a detrimental characteristic of conventionally designed carrier feet. Also, because the latching member of the present invention's operating mechanism is yieldably biased toward a latching and also locked configuration, the foot can be arranged into the latching and locked configuration before being positioned upon the base and then merely pressed into engagement with the base without further manipulation being required prior to utilization of the load carrier foot. A side benefit of this configuration is that it provides a fail-safe design because of the bias toward the locked configuration. That is, the load carrier foot is urged away from an unlatching or releasable configuration unless specifically reconfigured thereto by the operator. Still further, an advantageous characteristic of this design is that the load carrier foot is made installable and disengageable without the use of tools.

An additional benefit of the present invention is that the operative members of the load carrier foot are protectively and permanently housed within the shielding cover of the foot during normal utilization. There is no need to open the foot's housing since the only part of the operating mechanism requiring user manipulation is a push-button release mechanism. But even when the push button release mechanism is depressed for disengaging the foot from the base, the inner working mechanisms of the foot remain protected within the housing for the device.

A locking mechanism is provided that is capable of preventing depression of the push button release mechanism and in turn unauthorized disengagement of the rack from the base. As in traditional designs, the lock is manipulated between locked and unlocked configurations using a conventionally cut key.

As discussed, in order to adapt a universally designed foot to different roof configurations and therefore different transporting vehicles without varying the load carrier foot's construction, the latching mechanism in the foot includes a latch body that inserts into a space provided under a cylindrical catch bar thereby fastening the foot to the carrying vehicle. The latch body, however, is not fixed to the catch bar of the base, but instead is permitted to slide therearound. In this manner, pivotation of the foot about a longitudinal axis of the catch bar which is parallel to a longitudinal axis of the foot is facilitated thereby making it possible to adapt the same foot to differently configured vehicle roof designs. That is, the foot can be variably configured with respect to the base depending upon the pitch of the particular vehicle's roof at the point at which the base is connected.

The top or head portion of the load carrier foot in which a cross bar or load strut is engageable is manufactured to be exchangeable on the intermediate body portion of the foot. In the illustrated embodiment, the head portion is permanently fastened to the intermediate body portion prior to distribution to an end user. In this manner, the configuration of the foot is easily adapted by the manufacturer depending upon the anticipated shape and design of the cross bar expected to be utilized with the particular foot. In the preferred embodiment, a securing mechanism used for releasably locking the cross bar to the head portion of the load carrier foot incorporates members having opposed ramped surfaces that when slid relative to one another cause expansion and/or contraction of the securing mechanism into and/or out of securing engagement with the cross bar. An analogous securing device has been more fully described in commonly owned U.S. Pat. No. 5,038,988, the disclosure of which is expressly incorporated herein by reference.

The separate construction of the base member from the load carrier foot body makes it possible for that base member to be custom designed for installation upon a particularly configured vehicle. The connection between the base and the load carrier foot, however, is made generic so that the foot body need not be individually adapted for different vehicles. This makes providing an array of product for different vehicles much less expensive than in cases in which each foot must to be customly adapted for a particular vehicle.

As shown, the base can be left on the transporting vehicle with the catch bar exposed when a footed load carrier is not being used. The catch bar can be utilized as a tie-down loop in this configuration for securing other types of loads to the vehicle.

In at least one embodiment, the present invention takes the form of an arrangement for securing a load carrier to a transporting vehicle. The arrangement includes an anchor mechanism that is adapted for securement to a transporting vehicle and for releasable engagement with a load carrier foot. The load carrier foot of the invention has a latching mechanism for releasable engagement with the anchor mechanism. The latching mechanism is adapted for latching engagement to, and disengagement from the anchor mechanism by movement of the load carrier foot in a direction substantially perpendicular to a longitudinal axis of the load carrier foot. An example of such movement is vertical movement substantially of an up and down nature.

The latching mechanism has a latching and an unlatching configuration and the latching mechanism is urged toward the latching configuration by a resilient biasing mechanism. Further, the latching mechanism is adapted to move from the latching configuration to the unlatching configuration and back to the latching configuration under the influence of the resilient biasing mechanism and responsive to the load carrier foot being positioned into latching engagement upon the anchor mechanism. An example of the resilient biasing mechanism is a spring that yields from a latching configuration to an unlatching configuration of that spring as the latching mechanism moves from its latching configuration to its unlatching configuration.

In the illustrated embodiment, the latching mechanism has an operating mechanism for configuring the latching mechanism between the latching and the unlatching configurations. As shown, the operating mechanism includes a push-button actuator for operating the latching mechanism between the latching and the unlatching configurations. The push-button actuator is operatively associated with and controlled by a lock mechanism which is configured for alternatively allowing and preventing operation of the operating mechanism. Furthermore, the push-button actuator also cooperates with a resilient biasing mechanism for urging the push-button actuator toward a latching configuration.

The arrangement includes a housing configured to encase the operating mechanism and the latching mechanism thereby preventing access to such working mechanisms of the load carrier foot. In a preferred embodiment, the push-button actuator is exclusively exposed through the housing for operator manipulation. That is, the only portion of the load carrier foot that the operator must engage is the push-button actuator, and that is only when disengagement is required. Installation is accomplished without the operator having to manipulate the load carrier foot at all, other than to move it into the latched configuration.

The anchor mechanism has a catch member and the latching mechanism has a latch body. The latch body is configured for latching cooperation with the catch member. In the illustrated embodiment, the catch member is a bar suspended between a pair of supports. It is the bar that defines a catch area underneath itself for accepting at least a portion of the latch body therein.

The anchor mechanism is adapted to be fixed upon a vehicle with the catch member disposed at a distance from the vehicle. Usually, and as illustrated, this location is proximate the roof edges of the vehicle. The latch body has an abutment surface designed for engagement with the catch member in a latched configuration. As shown, the latch body has an inclined surface that is arranged for sliding engagement against the catch member as the load carrier foot is installed upon the anchor mechanism. This sliding engagement causes the latching mechanism to move from the latching configuration into the unlatching configuration thereby permitting installation of the load carrier foot into latched engagement upon the anchor mechanism.

Still further, the latching mechanism can be adapted to permit pivotation of the load carrier foot about an axis that is substantially parallel to the longitudinal axis of the load carrier foot while the load carrier foot is latched to the anchor mechanism. This makes it possible for the load carrier foot to be utilized on variously pitched vehicular support surfaces, usually automobile roofs having different shapes at their edge regions.

The latching mechanism has an operating mechanism for configuring the latching mechanism between the latched and the unlatching configurations. As shown, the operating mechanism has a pushing shoulder adapted to engage a receiving shoulder of the latch body for transferring or conveying movement of the operating mechanism to the latch body.

In at least one embodiment of the present invention, an exchangeable head assembly is provided that is coupleable; that is, designed to be connected to a top portion of the load carrier foot. The exchangeable head assembly is adapted for releasable fixation with a load carrier cross bar. When mounted upon a vehicle, a load carrier cross bar is coupled or connected between two such carrier feet that are each positioned near to opposite end portions of the load carrier cross bar for suspending the cross bar atop the transporting vehicle.

As illustrated, the anchor mechanism additionally includes an insert adapted to be securely received in a channel portion of a vehicularly mounted roof-top track. It is in this way that that particular version of the invention is secured upon a vehicle's roof that is adapted with such tracks.

In another embodiment, the present invention takes the form of an arrangement for securing a load carrier to a transporting vehicle that has an anchor mechanism adapted for securement to a transporting vehicle and for releasable engagement with a load carrier foot. The anchor mechanism has a catch member that is configured for engagement with a latching mechanism. A load carrier foot has a latching mechanism that is adapted to assume a latched configuration responsively to being positioned upon the catch member. The arrangement is further adapted to permit pivotation of the latching mechanism relative to the catch member when in a latched configuration so that the load carrier foot is permitted to be variably positioned with respect to the anchor mechanism after assumption of the latched configuration.

Still another embodiment of the invention takes the form of a method for securing a load carrier to a transporting vehicle. The method includes providing an anchor mechanism that is adapted for being secured to a transporting vehicle and for releasable engagement with a load carrier foot. The anchor mechanism has a catch member that is configured for engagement with a latching mechanism. A load carrier foot is installed that has a latching mechanism upon the catch member. The latching mechanism is adapted to assume a latched configuration under the exclusive actuation of the catch member in response to the load carrier foot being installed upon the anchor mechanism.

The method further includes resiliently biasing the latching mechanism toward a latching configuration prior to the load carrier foot being installed upon the anchor mechanism. The latching mechanism is then reconfigured from the latching configuration to an unlatched configuration and then to the latched configuration based solely on its cooperation with the catch member as the load carrier foot is being installed upon the anchor mechanism. After such installation, the load carrier foot may be pivoted relative to the anchor mechanism about an axis substantially parallel to a longitudinal axis of the load carrier foot after being installed upon the anchor mechanism and while the latching mechanism is in the latched configuration.

In yet another embodiment, an arrangement is provided in a load carrier for securing a load carrier cross bar to a transporting vehicle including a top portion of a load carrier foot adapted to releasably engage a load carrier cross bar. The load carrier cross bar has an elongate slot through a lower surface thereof. The elongate slot provides access to an interior space of the load carrier cross bar. An upper surface of the top portion of the load carrier foot is configured to abuttingly engage the lower surface of the load carrier cross bar. An insertible member is provided for interconnecting the load carrier cross bar to the load carrier foot. The insertible member has a neck portion and an expanded portion. The neck portion is configured to extend through the elongate slot and the expanded portion is configured to reside in the interior space of the load carrier cross bar in an assembled configuration. The expanded portion of the insertible member has a pressing surface configured to abuttingly engage an interior receiving surface of the load carrier cross bar so that a downward bias is exerted by the expanded portion and urges the load carrier cross bar into abutting engagement with the load carrier foot. The insertible member has a guide projection and the top portion of the load carrier foot has an inclined guide track configured to receive the guide projection therein for reciprocating movement of the guide projection in the guide track. An operating assembly reciprocates the guide projection in the guide track thereby causing movement of the insertible member toward the load carrier foot.

The beneficial effects described above apply generally to the exemplary devices and mechanisms disclosed herein of a load carrier foot arrangement. The specific structures through which these benefits are delivered will be described in detail hereinbelow.

BRIEF DESCRIPTION OF DRAWINGS

The invention will now be described in greater detail in the following way of example only and with reference to the attached drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Figure 1:
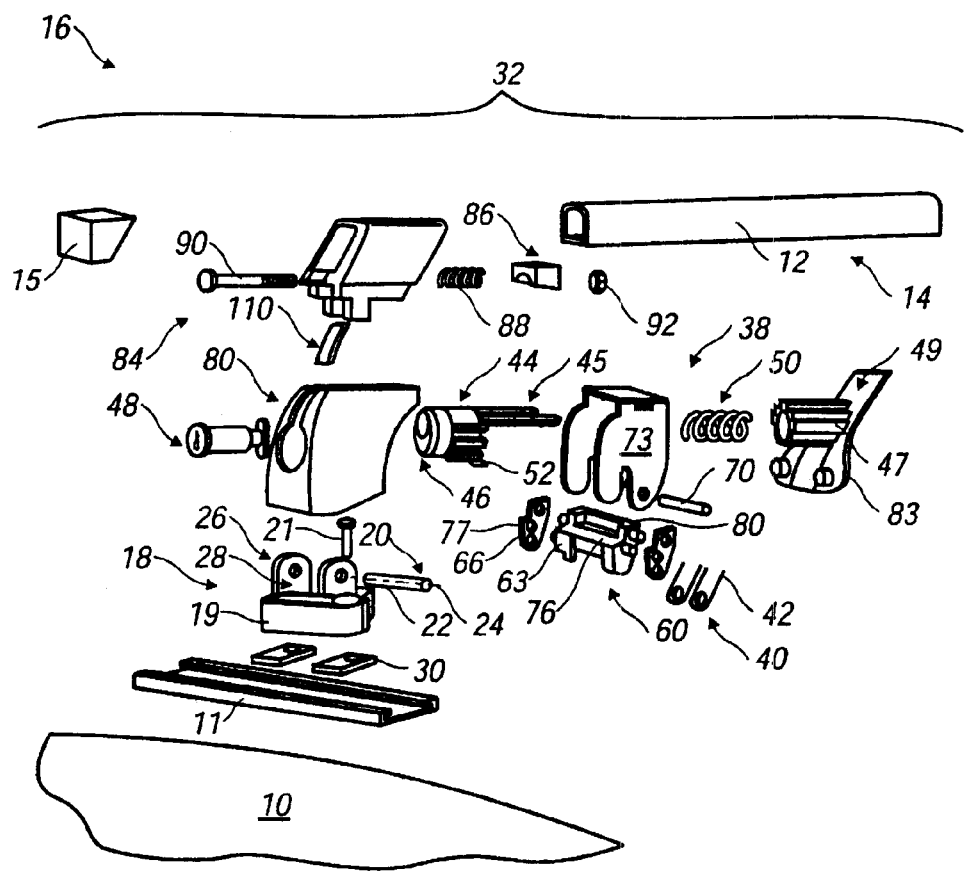
FIG. 1 is an exploded perspective view of a load carrier foot arrangement constructed according to the present invention.

Referring to the Figures, and particularly to FIG. 1 at this time, a partial section of the roof region of a transporting vehicle 10 is shown with a track channel 11 installed thereupon. The channel 11 typically has a C-shaped transversely viewed cross-section and may be mounted upon the upper exterior surface of an edge region of a vehicular roof or recessed thereinto. In either case, the track channel 11 is provided to accept insert portions 30 of an anchor mechanism 18 that is designed as a component of an arrangement 16 for securing a load carrier to transporting vehicle 10. The anchor mechanism 18 serves as a support platform for a load carrier foot 32. In the illustrated embodiment, the anchor mechanism 18 includes the square metal inserts 30 that are connected to a base portion 19, one each by a threaded screw 21. In use, the metal inserts 30 are positioned within the C-shaped channel 11 with the threaded screw 21 inserted through a lengthwise top opening into the channel 11. The headed portion of the screw 21 is located above the base portion 19 and the threaded portion of the screw 21 extends through the base portion 19 and into a receiving threaded aperture of the insert The base portion 19 is fixed with respect to the channel 11, and in turn the transporting vehicle 10 by sufficiently tightening the screws 21 so that the insert 30 is drawn up against the underside of the inwardly extending flanges of the channel 11 and so that a lower surface of the base portion 19 is pressed firmly against the vehicle's 10 supporting surface.

The arrangement 16 for securing a load carrier to a transporting vehicle 10 places the load carrier foot 32 above the anchor mechanism 18. A top portion 36 of the load carrier foot 32 is adapted to accept an exchangeable head assembly 84. The exchangeable head assembly 84 is provided for releasable engagement with a load carrier cross bar 12, typically at an end portion 14 thereof. Each head assembly 84 is adapted to be exchangeable with differently configured head assemblies 84. An array of head assemblies 84 may be differently configured because each is designed for releasably capturing a load carrier cross bar 12 having a different shape and design. Typically, the head assembly 84 will only be exchangeable for the manufacturer of the arrangement 16 and not the purchaser. That is, as far as the end-user or consumer is concerned, the head assembly 84 is a permanent part of the load carrier foot 32. One example of how this can be accomplished is by using threaded screws to couple the head assembly 84 to the top of the load carrier foot 32 from within the protected space of the interior region of the load carrier foot 32. In this manner the operational or headed end of the screw will not be easily accessed by the consumer. The exchangeable nature of the head assembly 84 is provided so that a manufacturer can easily vary the configurations of the load carrier foot 32 to accommodate a wide array of variously styled cross bars 12 that the consuming public may desire to use in combination with the load carrier foot 32 of the present invention.

As shown, the head assembly 84 includes a sliding wedge 86 that cooperates with an oppositely configured inclined plane within the head assembly 84. By drawing the sliding wedge 86 up the inclined plane, a tightening engagement between the wedge 86 and a corresponding surface of the load carrier cross bar 12 is affected. In the illustrated embodiment, a threaded bolt's 90 incorporation with a nut 92 is utilized for moving the wedge 86. A spring 88 is shown that acts to bias the wedge 86 down the inclined plane and toward a released configuration in which the cross bar 12 is permitted to slide longitudinally in the head assembly 84. Once the cross bar 12 is properly positioned and fixed to the load carrier foot 32, an end cap 15 may be pressingly installed upon the exposed end of the cross bar 12 for closing and providing a finished appearance for the cross bar 12 outside the load carrier foot 32.

Referring to FIG. 1, the configuration of the anchor mechanism 18 may be best appreciated. Extending upwardly from the base portion 19 are a pair of supports 26 that form flanges to which a catch member 20 is installable and fixable. In the illustrated embodiment, the catch member 20 takes the form of a cylindrical bar 22 having end portions retained within apertures that extend through each of the pair of supports 26. As will be described in greater detail hereinbelow, a central axis of the bar 22 serves as a pivotation axis 24 about which the load carrier foot 32 is pivotable in an installed configuration. In this manner, the bar 22 is suspended above an open space that defines a catch area 28.

The load carrier foot 32 includes an intermediate body portion 37 having a housing encasement 82 that covers and protects the internal working mechanisms of the foot 32. One of those working mechanisms is a latching mechanism 38 utilized for releasably securing the load carrier foot 32 to the anchor mechanism 18.

Serving as a support for the latching mechanism 38 are two side flanges 73, each having an aperture therethrough for receiving a pivot axle 70 upon which a latch body 60 is journal for pivotation between a latching configuration and an unlatching configuration. The latch body 60 is designed so that at least a portion thereof is insertible into the catch area 28 underneath the catch member 20.

Figure 2:
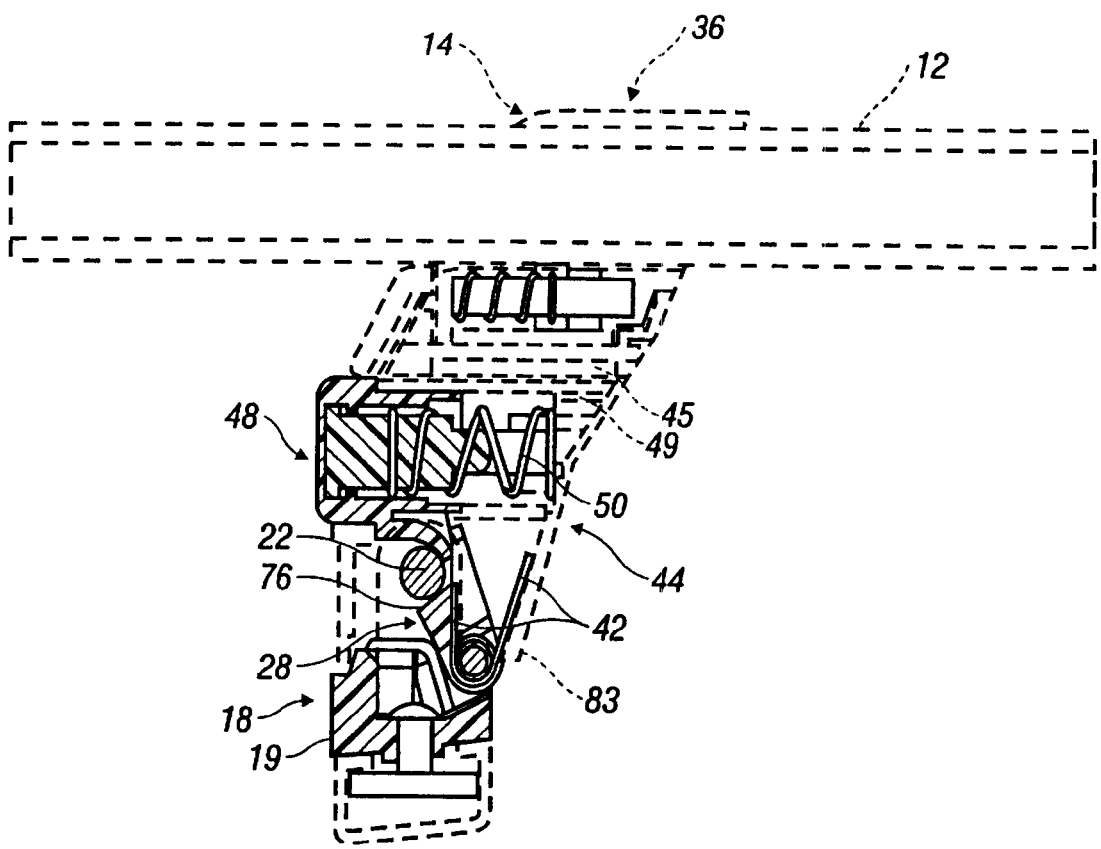
FIG. 2 is a partial cut-away and partial cross-sectional view taken substantially along a bisecting centerline of the load carrier foot arrangement of FIG. 1 in a latching configuration.

Referring to FIG. 1, an exploded configuration of the latch body 60 is shown depicting and interior body portion 63 sandwiched between two exterior ears 66. In a preferred embodiment, the interior body portion 63 is constructed from light-weight plastic and the exterior ears 66 are constructed from more durable steel. In this manner, most of the forces being conveyed through the latch body 60 are concentrated within the stronger ear portions 66. A resilient biasing mechanism 40 in the form of a spring 42 is utilized to urge the latch body 60 toward the latching configuration. The latching configuration is depicted in FIG. 2 in which an abutment surface 76 of the latch body 60 is under and in abutting engagement with the catch member 20.

The load carrier foot 32 and the anchor mechanism 18 are configured so that the foot 32 can be pressed or position into latched engagement with the anchor mechanism without further operator manipulation. To enable this feature, the installation process is initiated with the latch body 60 in the orientation depicted in Figure In this manner, as the load carrier foot 32 is moved into position adjacent to the anchor mechanism 18, an inclined surface 77 of the latch body 60, a surface which is exposed toward the anchor mechanism 18, is generally the first portion of the load carrier foot 32 to engage the catch member 20 upon proper approach. After initial engagement and as the load carrier foot 32 is moved further down onto the anchor mechanism 18, the bar 22 of the catch member 20 slides up the inclined surface 77 pressing the latch body 60 backward out of the bar's 22 way and in the process compresses the resilient biasing mechanism 40.

As illustrated, the resilient biasing mechanism 40 takes the form of the spring 42. Once the load carrier foot 32 is moved sufficiently far down upon the anchor mechanism 18 to be properly seated thereupon, the catch member 20 has slid beyond a top edge of the inclined surface 77 so that the latch body 60 springs outwardly into the catch area 28 under the influence of the spring 42. In this position, the abutment surface 76 is properly position to catch under the catch member 20. Under the bias of the spring 42, the latch body 60 will remain in the latching configuration under the catch bar 22 until purposely moved to an unlatching configuration by the operator.

Figure 3:
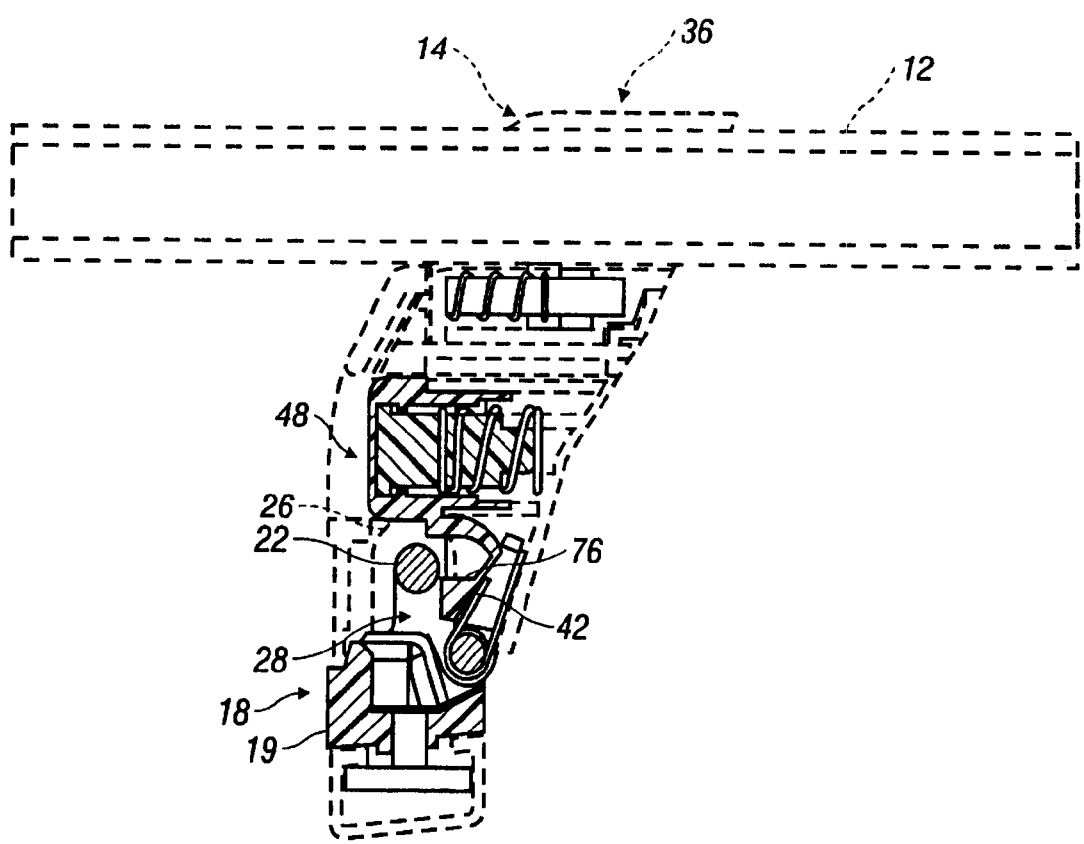
FIG. 3 is a partial cut-away and partial cross-sectional view taken substantially along a bisecting centerline of the load carrier foot arrangement of FIG. 1 in an unlatched configuration.

The unlatching configuration of the arrangement 16 is illustrated in FIG. 3. Therein, an operating mechanism 44 is shown depressed into the load carrier foot 32. The purpose of the operator depressing the operating mechanism 44 is to cause the pushing shoulder 52 of the operating mechanism 44 to also travel inwardly and engage the receiving shoulder 80 of the latch body 60. Continued inward travel of the pushing shoulder 52 causes the latch body 60 to be pivoted back out of the catch area 28 so that the abutment surface 76 is no longer trapped under the catch member 20. This effectively disengages the load carrier foot 32 from the anchor mechanism 18. The load carrier foot 32, and any load carrier or load carrier cross bar 12 connected to the foot 32 can now be lifted away from the transporting vehicle 10.

The operating mechanism 44 is manipulated by an operator through the use of the push-button actuator 46 which is at least partially exposed through the housing encasement 82. The actuator 46 includes guide prongs 45 as illustrated. An interior travel guide 47 is provided that is fixed upon a housing closure member 83 that matingly engages with the housing encasement 82 to form a substantially complete enclosure for the intermediate body portion 37 of the load carrier foot 32. The interior travel guide 47 has an exterior surface complimentarily configured to facilitate gliding operation of the push button actuator 46 thereupon. Still further, the interior travel guide 47 has receivers specifically arranged to form prong tracks 49 within which the guide prongs 45 slide and which also assist in guiding travel of the push button actuator 46 and its associated components, including the pushing shoulder 52.

A resilient biasing mechanism 50 in the form of a coil spring is provided to urge the push button actuator 46 toward an unactuated configuration as is shown in FIG. 2. In this manner, the pushing shoulder 52 will normally be moved away from the latch body 60 unless purposefully depressed by and operator to cause the assumption of the unlatching configuration of the load carrier foot 32.

A lock mechanism 48 is provided for cooperation with the push button actuator 46 of the operating mechanism 44. In the illustrated embodiment, the lock mechanism 48 is of a conventional design having a head portion with a protrusion that can be rotated into and out of locking engagement with a receiving recess using a conventional key. When in the locked configuration, the protrusion of the lock mechanism 48 prevents sliding operation of the push button actuator 46 upon the travel guide 47 because the protrusion is caught within the recess in the body 37 of the load carrier foot 32.

In this manner, unauthorized disengagement of the load carrier foot 32 from the anchor mechanism 18 is prevented. Because the latch body 60 is spring biased toward the latching configuration, the operating mechanism 44 can be locked prior to the foot 32 being positioned upon the anchor mechanism 18 and further manipulation by the operator is not required for affecting locked and latched connection of the foot 32 thereupon.

Figure 4:
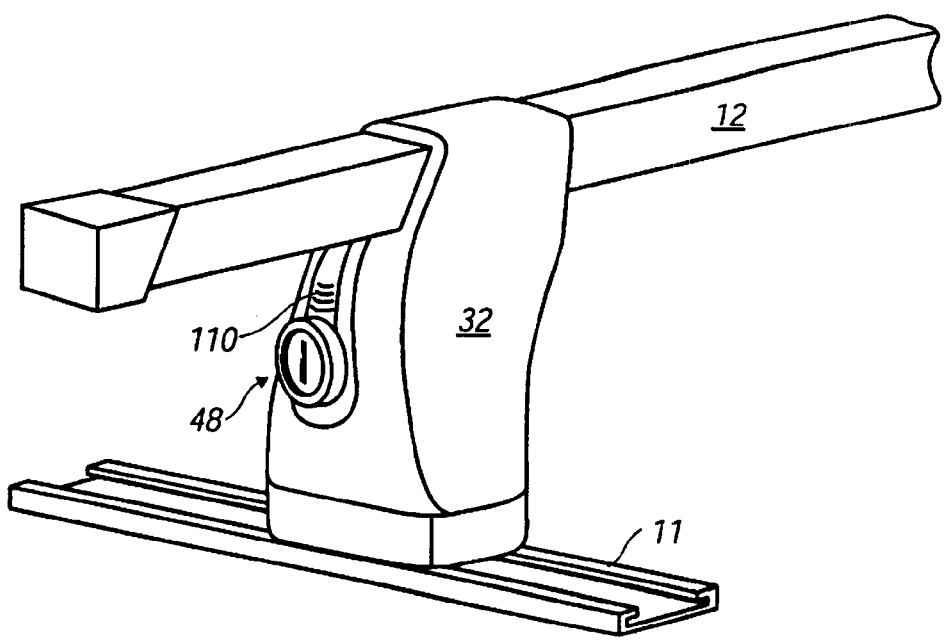
FIG. 4 is an assembled perspective view of the load carrier foot arrangement of FIG. 1.

A sliding cover 110 is shown in FIG. 1 and FIG. 4. As depicted in FIG. 4, the cover 110 is provided at an exterior surface thereof with fictional ridges intended to be engaged by a person's thumb or finger. When in the position shown in FIG. 4, the cover 110 completes the enclosure of the housing about the load carrier foot 32. During installation and removal of the foot 32 to a carrying vehicle, however, the cover 110 can be moved into a downward position when the push a button actuator 46 of the lock mechanism 48 is depressed. In so doing, the actuator 46 will be maintained in a released configuration. This greatly assists a user by making it possible to maintain two feet at opposite ends of a the cross bar 12 in released configurations until purposefully engaged to the base units 19. This is particularly important when it is considered that each of the two feet of the pair are typically configured for engagement to and removal from the vehicle at opposite sides of the automobile. The feet must be simultaneously moved to the releasing configuration at least for removal. This dual released configuration may also be desired during installation when proper positioning is initially required, and then the two separate feet are moved into the engaged configuration.

The sliding operation of the cover 110 may be accomplished by any suitable configuration, but a tongue-in-groove arrangement is preferably utilized. Still further, by having the tongue frictionally fit within the groove, upward and downward positions of the cover 110 may be maintained until purposely moved by the user.

Figure 5:
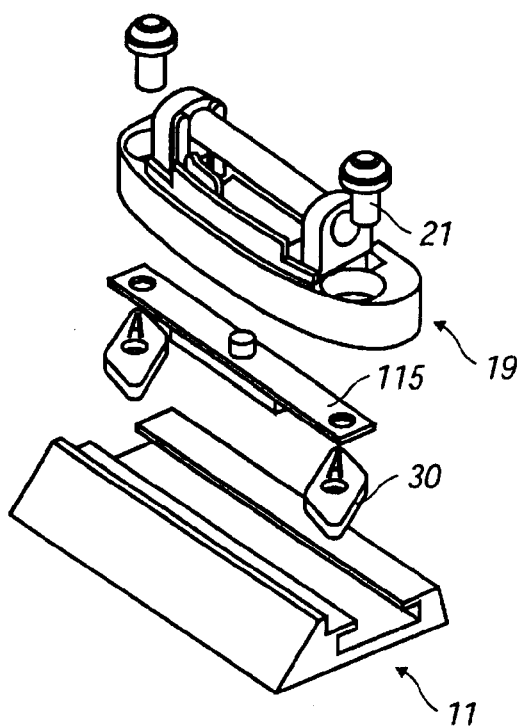
FIG. 5 is an exploded view demonstrating a spacer configured to be positioned between a base unit and the track channel.

FIG. 5 discloses an exploded view of a base portion 19 of the anchor mechanism 18 with a spacer 115 positioned between the base 19 and the track channel Because of the reduced-width slot through which the inserts 30 must pass into the interior space of the track channel 11, each insert 30 is configured in the shape of a parallelogram as illustrated. The inserts 30 are configured to accommodate their insertion through the top of the channel 19 because the end portions of the track are difficult to remove for proving access.

When tightening the base 19 to the track 11, the threaded screws or bolts 21 are rotated thereby pulling the insert 30 toward the base 19. Before a tightened orientation is achieved, it is possible for there to be play between the base 19 and the top of the track In this condition, it is possible for one of the insert 30 to protruded back out of a the slot of the track 11 thereby fouling its engagement therein.

Figure 6:
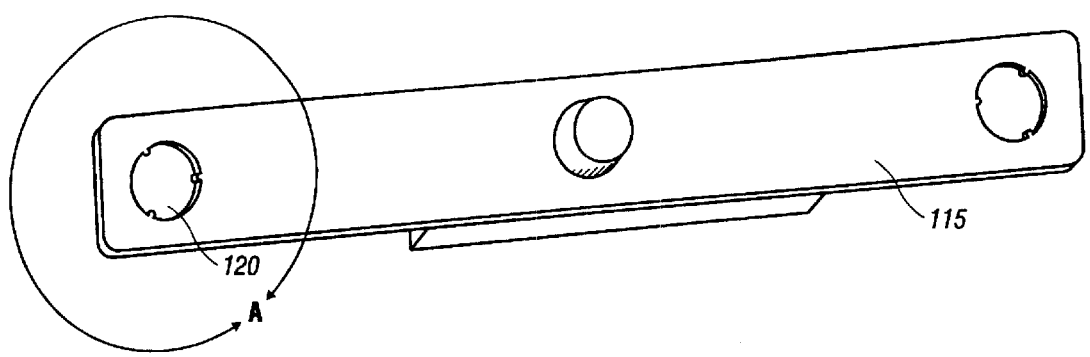
FIG. 6 is a perspective view of the spacer.
Figure 7:
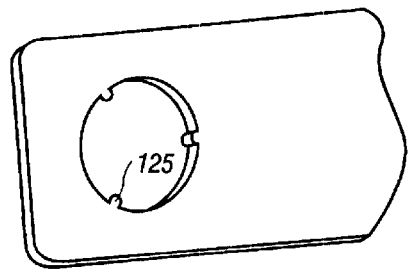
FIG. 7 is a perspective view of a bolt aperture in the spacer.

This condition in which an end portion of the insert 30 can protruded out of the slot of the track 11 is enhanced when the base 19 is not centered above the slot of the track Therefore, the spacer 115 has been provided to establish a proper orientation and to prevent the unintended protrusion and misinstallation of the insert 30 into the channel of the track 11. The insert 115 has a pin-portion 130 at its upper surface intended to be inserted into a receiver at the bottom of the base 19. An expanded portion at the bottom side of the spacer 115 is configured for insertion into the slot of the track 11. As best shown in FIGS. 6 and 7, bolt apertures 120 are provided at each end of the spacer 115 for accepting the threaded bolts 21 therein. Threaded inserts or protrusions 125 are provided at an interior periphery of the apertures 120 for engaging the threads of the bolts 21. In this manner, the bolts 21 are prevented from unintentionally disengaging from that apertures 120 in the event that the spacer 115 is turned upside down during the installation process. Still further, these protrusions 125 keep the easily separable bolts 21 and spacer 115 together so that they are less likely to be lost one from the other.

Figure 8:
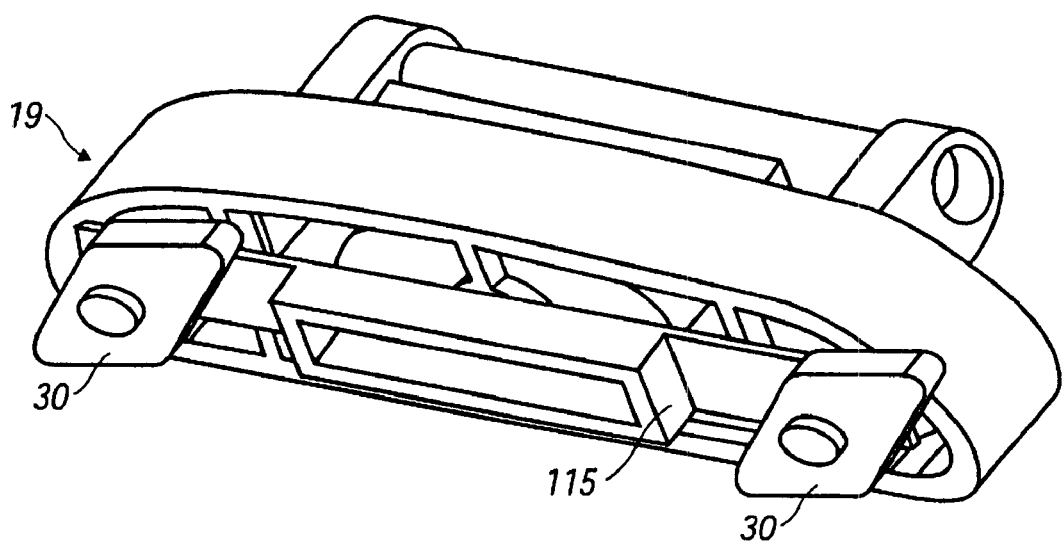
FIG. 8 is a bottom perspective you of the spacer connected to a base unit.
Figure 9:
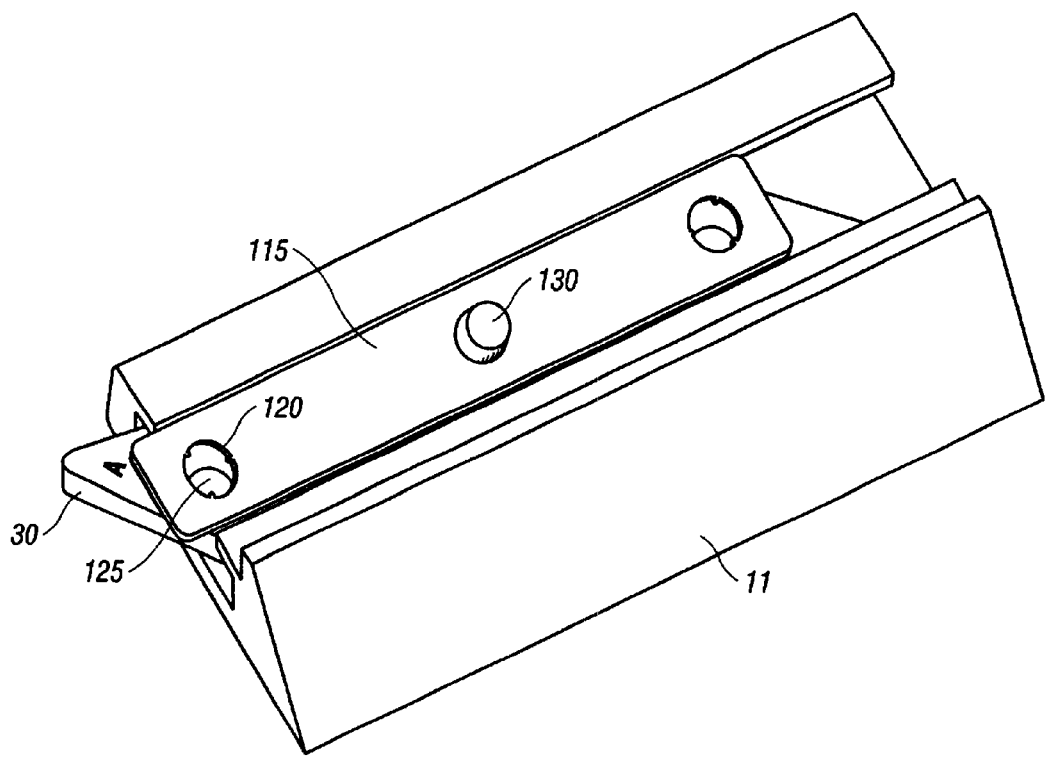
FIG. 9 is 8 top perspective view of a spacer positioned in a track slot.
Figure 10:
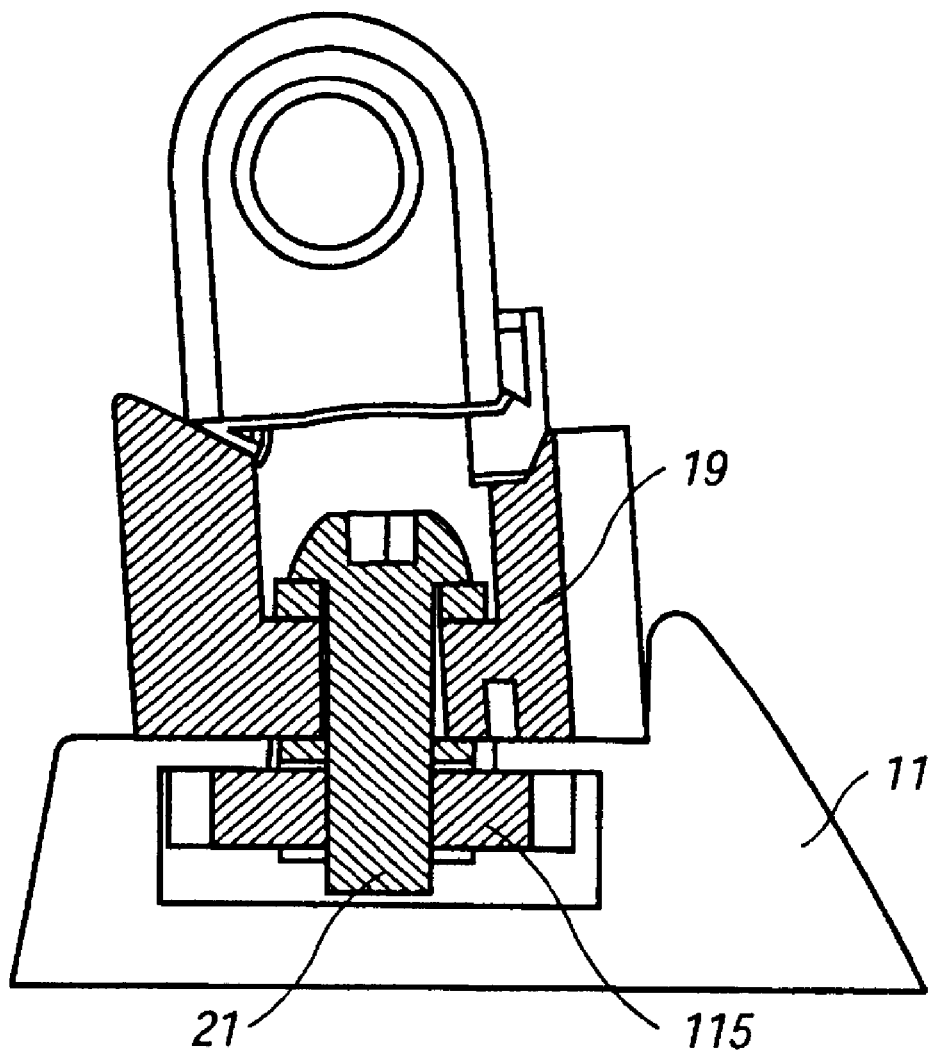
FIG. 10 is a cross-sectional view of a base attached to a track slot, including a spacer.

FIG. 8 provides a perspective bottom view of an assembled base portion 19 and spacer 115. FIG. 9 provides a top perspective view of a spacer 115 located in the track 11 with the inserts 30 shown in their proper installed orientation. FIG. 10 shows a cross-sectional view of an assembled arrangement of a base 19 with a spacer 115 properly installed in a track 11.

Figure 11:
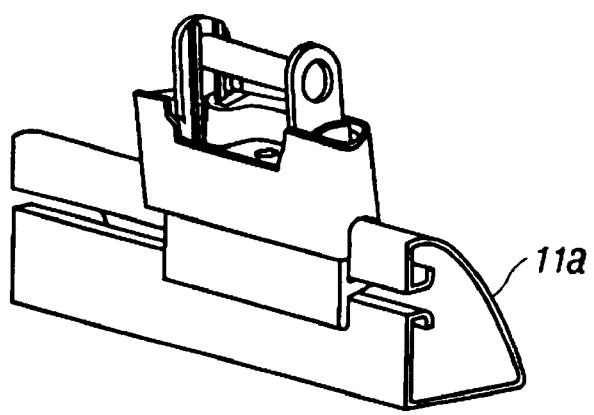
FIG. 11 is a perspective view of an accommodation unit.
Figure 12:
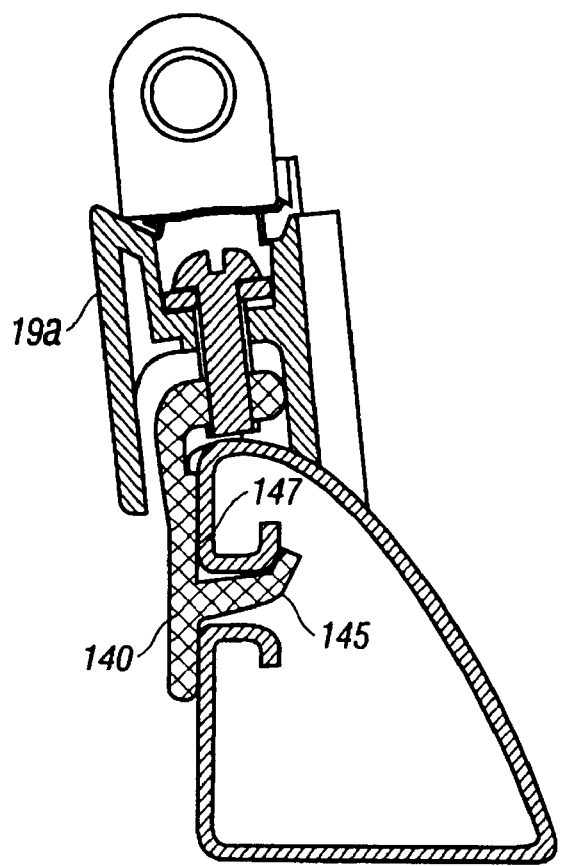
FIG. 12 is a cross-sectional view of an accommodation unit installed interstitially between a specially configured base unit and a side-access track.

FIG. 11 shows an alternative track configuration 11a in which the access slot is provided in a sidewall thereof. As shown, this slot is typically too close to the top surface of the carrying vehicle 10 for adequate utilization. Still further, a problem occurs when clamping to such a rail because the slot is perpendicular to the roof surface of the vehicle. As a result, on otherwise configured the base would rotate out of the slot when a force is applied in a direction normal thereto. To counter this motion, a stop 147 has been incorporated into a mounting bracket characterized as an accommodation unit 140. FIG. 12 shows a cross-sectional view in which the accommodation unit 140 is provided for connecting an alternatively configured base 19a to the track 11a. The accommodation unit 140 includes an insert tab 145, that runs longitudinally along the length of the accommodation unit 140 and is configured for being inserted into the access slot of the track 11a. The tab 145 is turned up at its distal end for engagement with interior lips of the slot. In other respects, the accommodation unit 140 is configured to properly position the base 19a with respect to the track 11a for operation and utilization.

Figure 13:
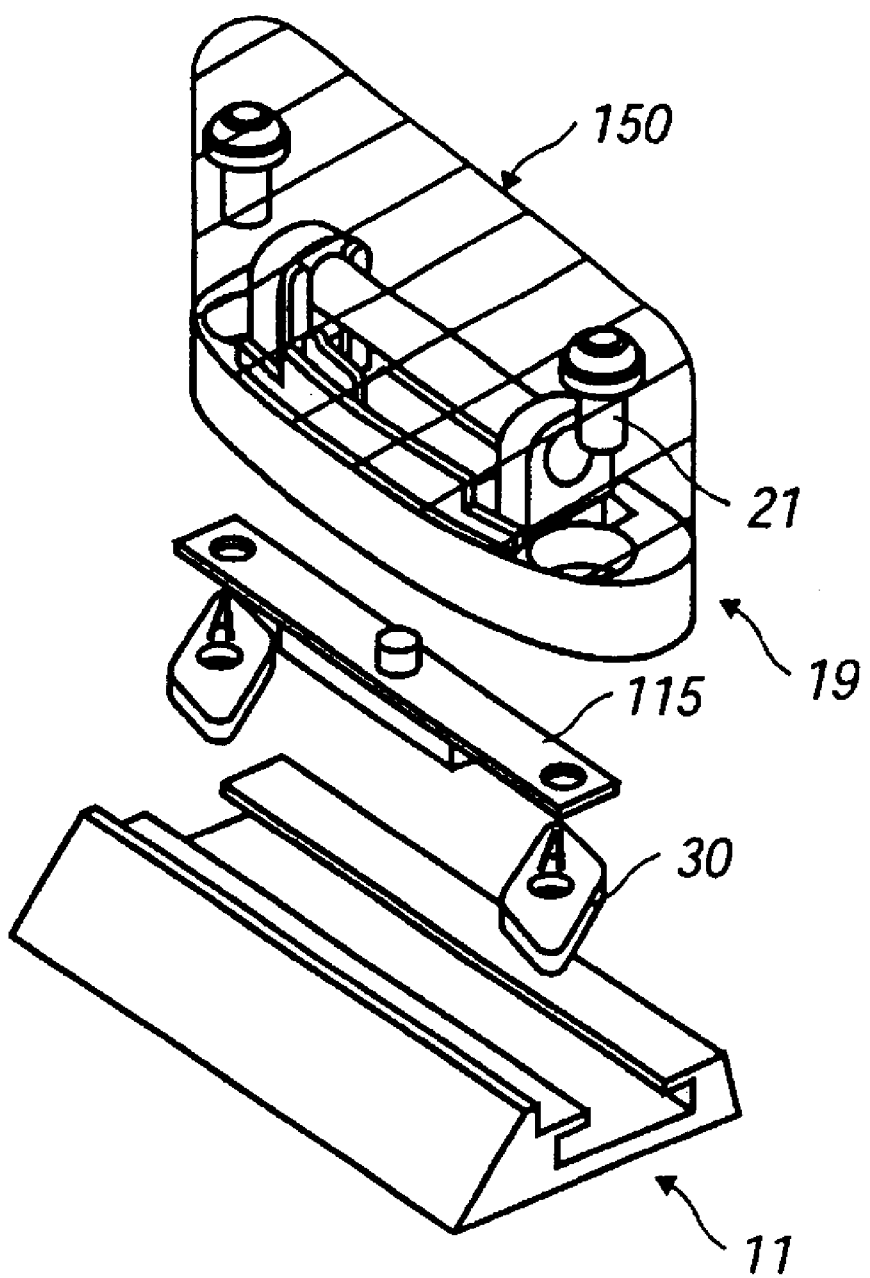
FIG. 13 is an exploded perspective view demonstrating a base cover installed over a base unit in a spacer-incorporating configuration.

FIG. 13 provides a perspective view in which a base cover 150 is shown that can be readily installed upon the base 19. It is a characteristic of the present invention that the base portion 19 may remain attached to the carrying vehicle 10 even when the rack system is detached therefrom. The interior workings of the base portion 19, however, remain exposed when a load carrier foot 32 is not installed there upon. Therefore, it is desirable to have a cover such as that shown as the base cover 150 which not only serves an aesthetic purpose, but also protects the mechanisms of the base 19 from dirt and possible damage if struck by an object. Still further, the base cover 150 can provide protection for persons in its vicinity or who are struck by the base 19 by is provision of a smooth surface that is less likely to gouge into a person or object upon contact. The connection assembly between the cover 150 and the base 19 can be similarly configured to the connective mechanisms disclosed for the load carrier foot 32, or any other suitable releasable connective arrangement adequate to serve this purpose.

An alternative embodiment of an arrangement 200 in a load carrier for securing a load carrier cross bar 212, via a load carrier foot 232, to a transporting vehicle 10, is illustrated in FIGS. 14–20. Therein, an embodiment is shown in which an insertible member 250 of the arrangement 200 is configured to be at least partially inserted into an interior portion of the load carrier cross bar 212. By pulling the insert member 250 downward, a lower surface 218 of the cross bar 212 is urged into pressed engagement with an upper surface 240 of a top portion 236 of the load carrier foot 232. Joinder of the top portion 236 to the intermediate body portion 37 is accomplished utilizing the interconnecting portion 238, advantageously shown as an aperture for receiving a connective pin that may extend through the interconnecting portion 238 and a portion of the intermediate body portion 37 of the load carrier foot 232.

Figure 14:
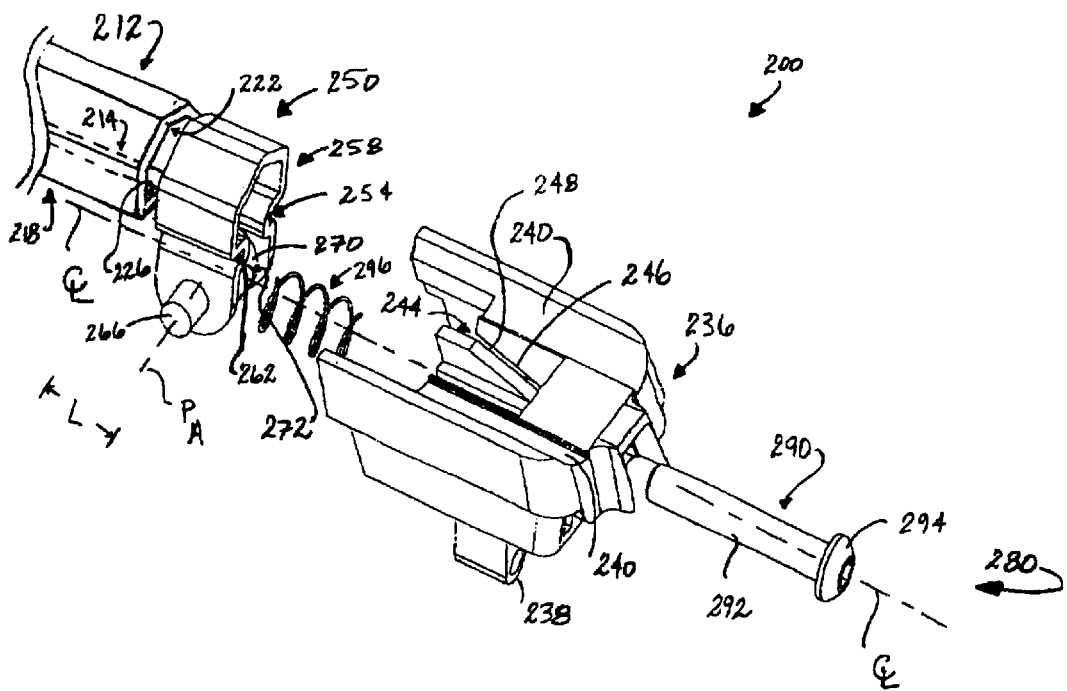
FIG. 14 is and exploded view of an alternative embodiment of the arrangement of the present invention demonstrating a configuration utilizing an insertible member that couples the load carrier cross bar to the load carrier foot and utilizes and an inclined guide track in the securement operation.

As may be best appreciated in FIG. 14, the load carrier cross bar 212 has an elongate slot 214 in the lower surface 218 which extends through the wall serving as a backup thereto. The slot or gap 214 provides access into an interior space 222 defined by the several walls of the cross bar 212. In a preferred embodiment, such a load carrier cross bar 212 may be advantageously encased within a plastic sheath which provides protection therefor.

Because of the presence of the slot 214, shelf-type or lip arrangements are established immediately on each side of the slot 214 by the portion of the wall through which the slot 214 has been cut and which remain as part of the bar 212. These shelf-type portions establish interior receiving surfaces 226 whose function in this regard will be described in greater detail hereinbelow.

The insert member 250 has an upper expanded portion 258, a bottom portion configured to interconnect with the top portion 236 of the foot 232, and a narrowed neck portion 254 positioned interstitially therebetween. Because of the positioning of the expanded portion 258 adjacent to the neck portion 254, pressing surfaces 262 are established at the undercut formed at the lower region of the expanded portion 258 at the top of the neck portion 254. In the illustrated embodiment, the pressing surfaces 262 are predominately downwardly directed and are intended for surface-to-surface engagement with the interior receiving surfaces 226. The pressing surfaces 262 have a length, L, that is illustrated in FIG. 14.

As intimated above, releasable engagement of the cross bar 212 to the load carrier foot 232 is achieved by exerting a downward bias on the insertible member 250. This downward bias is accomplished utilizing two inclined guide tracks 244, one each positioned on either side of the insertible member 250. As may be best appreciated in FIG. 19, the guide tracks 244 each include an upper track surface 246 and a lower track surface 248. The insertible member 250 includes two guide projections 266, each configured to be complimentarily inserted into one of the two guide tracks 244.

FIG. 14 shows a preferred embodiment of the guide projections 266 formed as solid cylinders. In this configuration, the guide projections 266 may be considered to be insert pins. Based on the round shape of the projections 266, it may be readily appreciated that the insertible members 250 are intended to be pivotable about a pivot axis ($P_A$) which is generally coincident with a centerline of the guide projections 266. The round configuration is particularly advantageous because it enables pivotation of the insertible member 250, even when the projections 266 are restricted in the guide tracks 244.

An operating assembly 280 is provided which is utilized to move the insertible member 250 along the tracks 244. The operating assembly 280 is shown to include a driving member 290 in the form of a threaded and headed bolt. The bolt 290 includes an elongate threaded portion 292 and a key receiver 294 at the head-end of the bolt. In a preferred embodiment, the key receiver 294 is provided as a hexagonally shaped recess which may be operated using a hex-head key.

A receiving member 270 is provided in the lower portion of the insertible member The receiving member 270 is included as a component of the operating assembly 280 to cooperate with the driving member 290. In a preferred embodiment, the receiving member 270 is coupled to a main body of the insertible member 250 in a manner which permits rotation (pivotation) of the receiving member 270 relative to the insertible member 250. It is contemplated, however, that the receiving member 270 may be fixed with respect to the insertible member 250. But as shown, a preferred rotational capability of the receiving member 270 relative to the insertible member 250 is provided about an axis substantially coincident with the pivot axis ($P_A$) of the guide projections 266. In the preferred embodiment, the guide projections 266 may even be provided as axles for the receiving member 270. In this configuration, apertures are provided through lower portions of the insertible member 250 and the guide projections 266 inserted therethrough. As will be described in greater detail with respect to operational procedures of the arrangement 200, the rotational capability of the receiving member 270 relative to the main body of the insertible member 250 is desired so that alignment between a centerline of an aperture 272 through the receiving member 270 will always be easily established with a long axis or centerline of the driving member 290.

At least two possible configurations are contemplated with respect to the aperture In the illustrated embodiment, the aperture is provided with a smooth interior surface through which the threaded portion 292 of the driving member 290 is inserted. A nut (not shown) is provided at the opposite side of the receiving member 270 to the driving member 290 for threaded engagement with the bolt 290. As may be readily appreciated, this configuration enables the insertible member 250 to be drawn toward of the head-end of the bolt 290 responsive to turning of the nut-engaged bolt 290. The reset spring 296 is provided in order to push the insertible member 250 back to the pre-load configuration of FIGS. 15 and 16. Alternatively, the aperture 272 may be threaded for direct receipt of the threaded end 292 of the bolt 290. In this configuration, the reset spring 296 is not necessary because counter-rotation of the threaded bolt 290 results in a pushing away of the insertible member 250. In either of these two configurations, however, the driving member 290 is advantageously connected to the body of the top portion 236 so that rotation of the bolt 290 is permitted, but longitudinal movement of the bolt 290, relative to the top portion 236, is substantial prohibited. As will be appreciated by those skilled in the load carrier arts, accommodation of rotation, while preventing longitudinal translation may be easily achieved by capturing a smoothed and recessed portion of the bolt 290, preferably at a location adjacent to the headed-end thereof.

Figure 15:
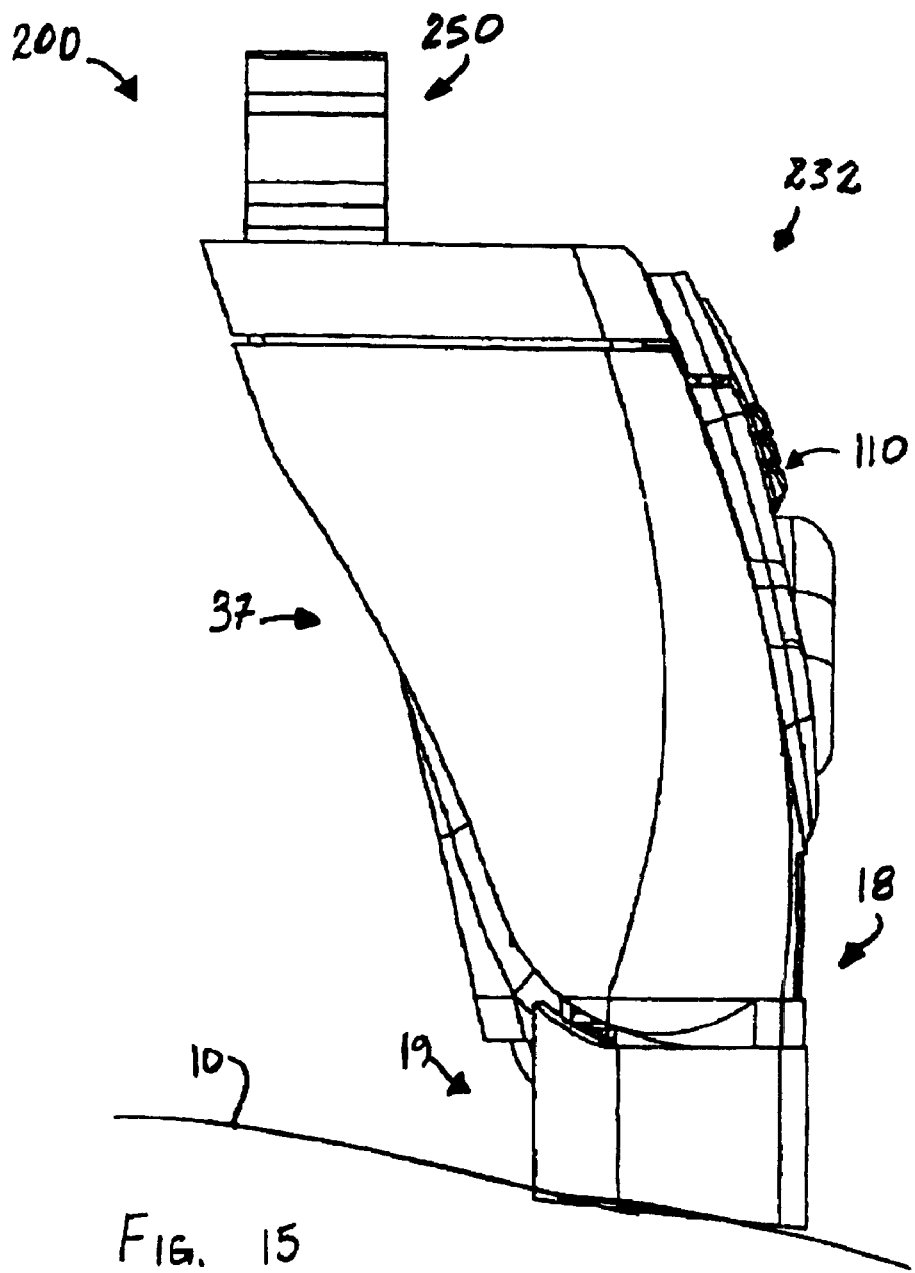
FIG. 15 is an elevational side view of the alternative embodiment exhibited in FIG. 14, but illustrating the entire load carrier foot assembly with of the insertible member shown in the pre-loaded position.
Figure 16:
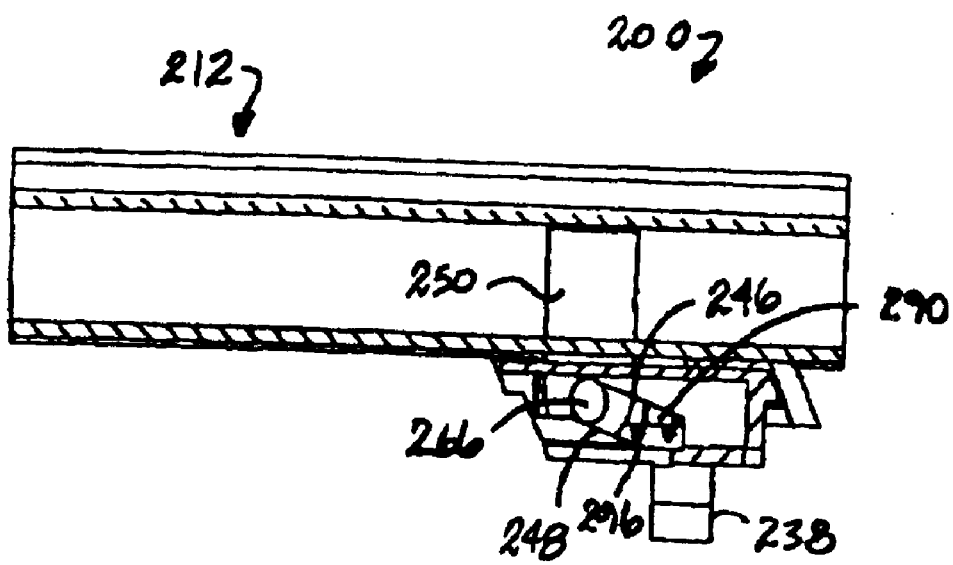
FIG. 16 is a partial cross-sectional, partial cutaway view of the top portion and load carrier cross bar of FIG. 15.
Figure 17:
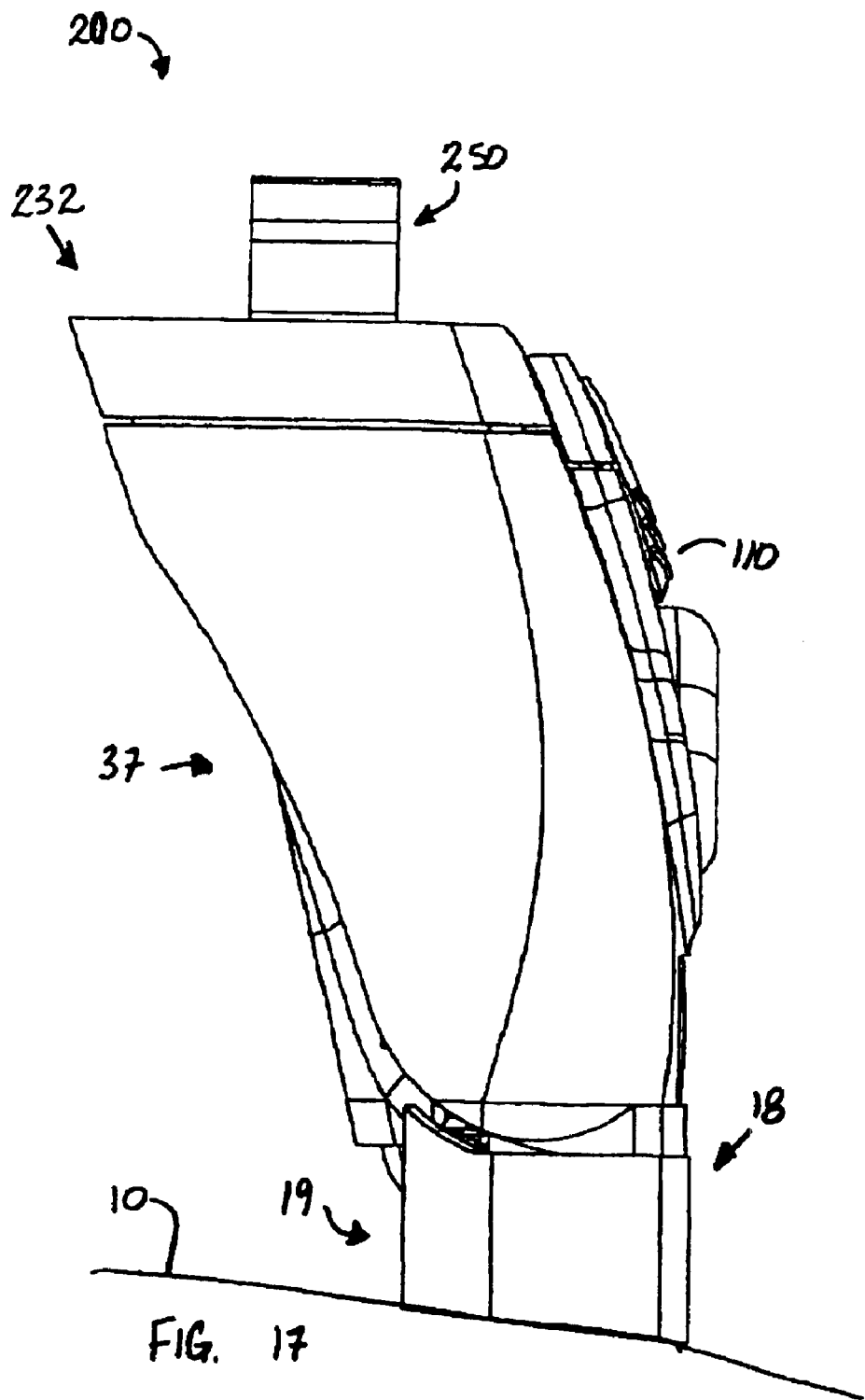
FIG. 17 is an elevational side view of the alternative embodiment exhibited in FIG. 14, but illustrating the entire load carrier foot assembly with of the insertible member shown in the loaded position.

In operation, an initial configuration that is readied for securing the load carrier cross bar 212 to the load carrier foot 232 is illustrated in FIGS. 15 and 16. The insertible member 250 is in a pre-load configuration so that the expanded portion 258 extends sufficiently above the top portion 236 so that it may be inserted into the interior space 222 of the cross bar 212 with the neck portion 254 located substantially in the slot 214. The guide projections 266 are positioned in the upper reaches of the inclined guide tracks 244.

Figure 18:
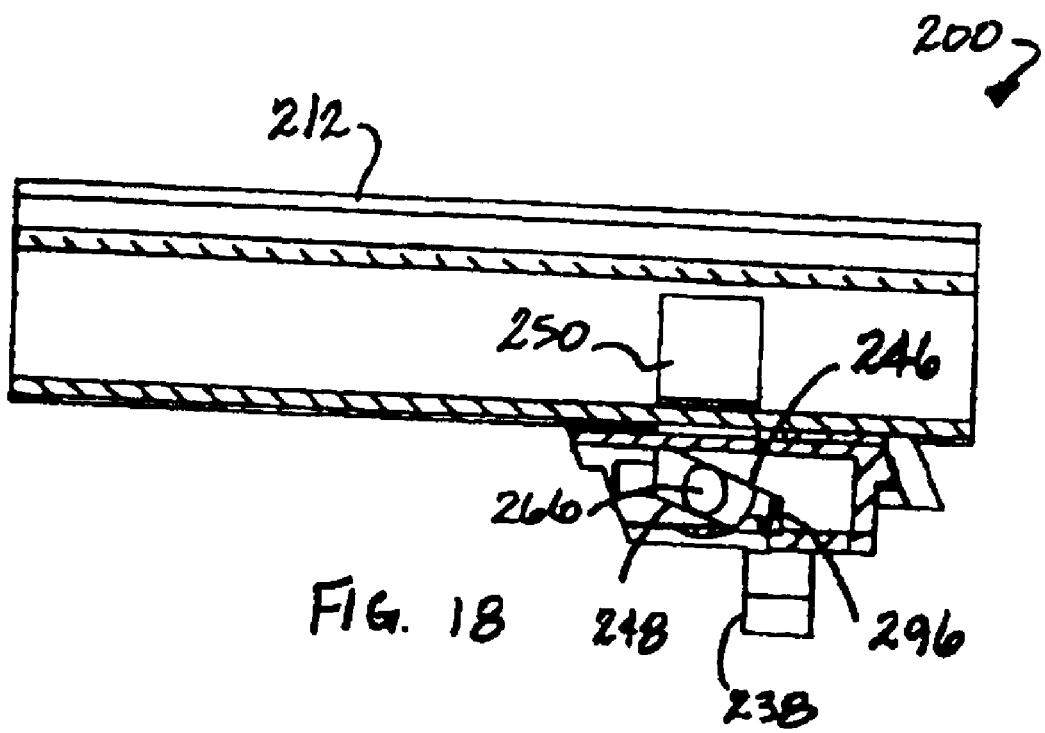
FIG. 18 is a partial cross-sectional, partial cutaway view of the top portion and load carrier cross bar in an intermediate position between the pre-loaded and loaded configurations.
Figure 19:
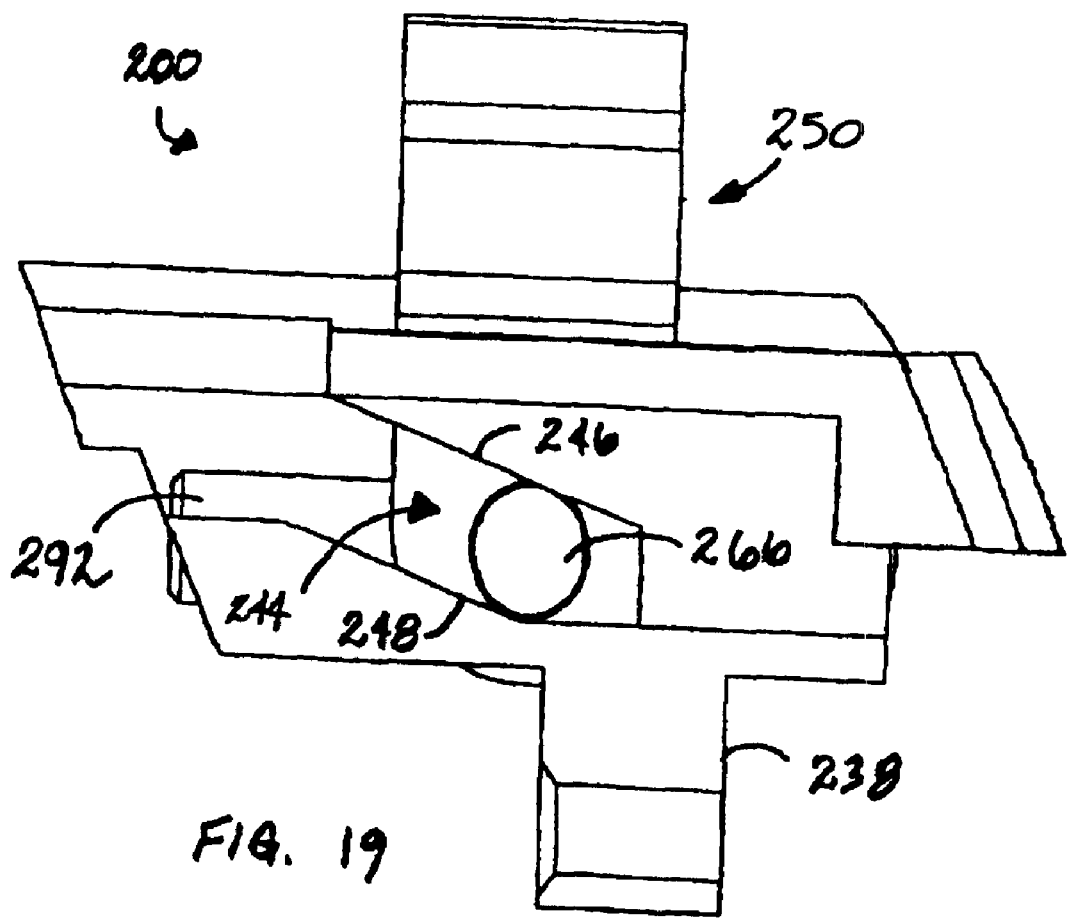
FIG. 19 is a partial cutaway view of the top portion and load carrier cross bar in a substantially loaded configuration.
Figure 20:
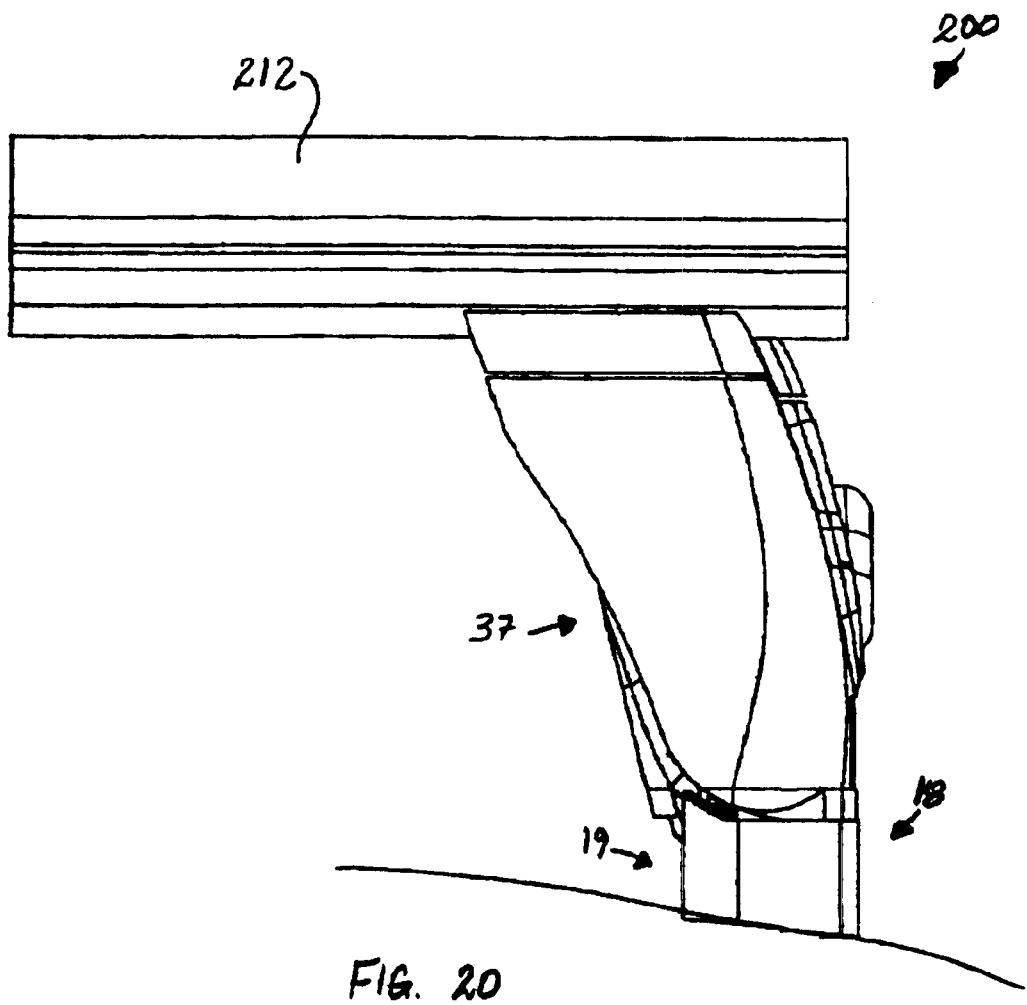
FIG. 20 is an elevational side view showing a portion of a load carrier cross bar secured upon a load carrier foot.

The driving member 290 is then rotationally operated so that the insertible member 250 is drawn toward the head of the bolt 290. As a result, the guide projections 266 are drawn through the guide tracks 244 resulting in the insertible member 250 moving downward and to the right as shown in the sequence of FIGS. 16, 18 and 19. In this manner, the guide projections 266 are slid along the upper track surface 246. Still further, because of the round configuration of the projections 266, rolling or pivoting of the insertible member 250 relative to the top portion 236 is enabled. This action is further enhanced when pivotation of the receiving member 270 is accommodated relative to the insertible member 250. By providing this independent rotational characteristic for the receiving member 270, substantial alignment between the expanded portion 258 and the interior space 222 of the load carrier cross bar 212 is simultaneously accommodated together with alignment of centerlines of the aperture 272 and the bolt 290.

This accommodation is an important feature of this embodiment in that it facilitates substantially continuous surface-to-surface engagement between the pressing surfaces 262 of the insertible member 250 and the interior receiving surfaces 226 of the load carrier cross bar 212 during the tightening and loosening processes. This surface-to-surface engagement along the long dimensions of these two surfaces 262,226 helps to assure maintenance of a substantially parallel orientation of those same two surfaces 262,226 during operation. As such, binding of the insertible member 250 is less likely to occur. Ultimately during the tightening process, the lower surface 218 of the load carrier cross bar 221 is drawn sufficiently snugly against the upper surface 240 of the top portion 236 of the load carrier foot 232 for fixed positioning relative thereto. This can be considered to be the loaded or transporting configuration of the arrangement 200.

When it is desired that the load carrier cross bar 212 be detached from the load carrier foot 232, the action of the operating assembly 280 is reversed. In the event that the aperture 272 is interiorly threaded, the insertible member 250 will be forcibly backed away from the headed end the bolt 290 back to the pre-loaded, or released configuration. If the aperture 272 is smooth at its interior surface and a nut has been utilized, similar activity is undertaken by the operator, but the insertible member 250 is pushed back to the pre-loaded configuration by the reset spring 296.

For purposes of orientation, it should be appreciated that in FIGS. 14–20, the right side of each drawing corresponds to the outboard side of the carrying vehicle 10 and the left side is directed toward a centerline of the vehicle 10.

Exemplary arrangements for securing a load carrier, including a load carrier strut or cross bar, to a transporting vehicle 10 has been described herein. These and other variations which will be appreciated by those skilled in the art are within the intended scope of this invention as claimed below. As previously stated, detailed embodiments of the present invention are disclosed herein; however, it is to be understood that the disclosed embodiments are merely exemplary of the invention that may be embodied in various forms.

What is claimed is:

1. An arrangement in a load carrier for securing a load carrier cross bar to a transporting vehicle, said arrangement comprising:
   a top portion of a load carrier foot releasably engaging a load carrier cross bar, said load carrier cross bar having an elongate slot through a lower surface thereof, said elongate slot providing access to an interior space of said load carrier cross bar;
   an upper surface of said top portion of said load carrier foot configured to abuttingly engage said lower surface of said load carrier cross bar;
   an insertible member interconnecting said load carrier cross bar to said load carrier foot, said insertible member having a neck portion and an expanded portion, said neck portion extending through said elongate slot and said expanded portion residing in said interior space of said load carrier cross bar;
   said expanded portion of said insertible member having a pressing surface abuttingly engaging an interior receiving surface of said load carrier cross bar so that a downward bias is exerted by said expanded portion thereby urging said load carrier cross bar into abutting engagement with said load carrier foot;
   said insertible member having a guide projection and said top portion of said load carrier foot having an inclined guide track configured to receive said guide projection therein for reciprocating movement of said guide projection in said guide track; and
   an operating assembly that reciprocates said guide projection in said guide track thereby causing movement of said insertible member toward said load carrier foot.

2. The arrangement as recited in claim 1, wherein said operating assembly further comprising
   a receiving member pivotally connected to said insertible member and arranged to engage a driving member so that said expanded portion of said insertible member pivots to maintain proper positioning relative to said load carrier cross bar during reciprocation of said guide projection in said guide track.

3. The arrangement as recited in claim 1, wherein said operating assembly further comprising
   a receiving member pivotally connected to said insertible member and arranged to engage a driving member so that said expanded portion of said insertible member is pivotable to various orientations relative to said load carrier foot for accommodating utilization of said arrangement on variously oriented mounting surfaces for said load carrier foot.

4. The arrangement as recited in claim 1, further comprising:
   said pressing surface of said insertible member engaging said interior receiving surface of said load carrier cross bar along a substantial entirety of a length of said pressing surface thereby facilitating maintenance of a substantially parallel orientation between said pressing and receiving surfaces and avoiding binding of said insertible member during operation.

5. An arrangement in a load carrier for securing a load carrier cross bar to a transporting vehicle, said arrangement comprising:
   an insertible member adapted for interconnecting a load carrier cross bar to a load carrier foot, said insertible member having a neck portion and an expanded portion, said neck portion configured to extend through an elongate slot of the load carrier cross bar and said expanded portion configured to reside in an interior space of the load carrier cross bar when in an assembled configuration; and
   said insertible member having a guide projection configured to be received in an inclined guide track and adapted for reciprocating movement in the guide track.

6. The arrangement as recited in claim 5, further comprising:
   an operating assembly that reciprocates said guide projection in said guide track thereby causing movement of said insertible member toward a supporting load carrier foot.

7. An arrangement in a load carrier for securing a load carrier cross bar to a transporting vehicle, said arrangement comprising:
   a top portion of a load carrier foot adapted to releasably engage a load carrier cross bar, said load carrier cross bar having an elongate slot through a lower surface thereof, said elongate slot providing access to an interior space of said load carrier cross bar;

an upper surface of said top portion of said load carrier foot configured to abuttingly engage said lower surface of said load carrier cross bar;

an insertible member for interconnecting said load carrier cross bar to said load carrier foot, said insertible member having a neck portion and an expanded portion, said neck portion configured to extend through said elongate slot and said expanded portion configured to reside in said interior space of said load carrier cross bar in an assembled configuration;

said expanded portion of said insertible member having a pressing surface configured to abuttingly engage an interior receiving surface of said load carrier cross bar so that a downward bias exerted by said expanded portion urges said load carrier cross bar into abutting engagement with said load carrier foot; and said insertible member having a guide projection and said top portion of said load carrier foot having an inclined guide track configured to receive said guide projection therein for reciprocating movement of said guide projection in said guide track.

8. The arrangement as recited in claim 7, wherein said operating assembly further comprising an operating assembly that reciprocates said guide projection in said guide track thereby causing movement of said insertible member toward said load carrier foot.

9. The arrangement as recited in claim 7, wherein said operating assembly further comprising a receiving member pivotally connected to said insertible member and arranged to engage a driving member so that said expanded portion of said insertible member pivots to maintain proper positioning relative to said load carrier cross bar during reciprocation of said guide projection in said guide track.

10. The arrangement as recited in claim 7, wherein said operating assembly further comprising a receiving member pivotally connected to said insertible member and arranged to engage a driving member so that said expanded portion of said insertible member is pivotable to various orientations relative to said load carrier foot for accommodating utilization of said arrangement on variously oriented mounting surfaces for said load carrier foot.

11. The arrangement as recited in claim 7, further comprising:

said pressing surface of said insertible member engaging said interior receiving surface of said load carrier cross bar along a substantial entirety of a length of said pressing surface thereby facilitating maintenance of a substantially parallel orientation between said pressing and receiving surfaces and avoiding binding of said insertible member during operation.

* * * * *